(12) United States Patent
DiDomenico et al.

(10) Patent No.: US 6,172,642 B1
(45) Date of Patent: Jan. 9, 2001

(54) RADAR SYSTEM HAVING A FERROELECTRIC PHASED ARRAY ANTENNA OPERATING WITH ACCURATE, AUTOMATIC ENVIRONMENT-CALIBRATED, ELECTRONIC BEAM STEERING

(75) Inventors: Dale M. DiDomenico, Indian Harbour Beach, FL (US); William C. Drach, Neptune; Thomas E. Koscica, Clark, both of NJ (US)

(73) Assignee: The United States of America as represented by the Secretary of the Army, Washington, DC (US)

( * ) Notice: Under 35 U.S.C. 154(b), the term of this patent shall be extended for 0 days.

(21) Appl. No.: 09/128,639

(22) Filed: Jul. 30, 1998

(51) Int. Cl.$^7$ ....................................................... H01Q 3/26
(52) U.S. Cl. .............................................................. 342/368
(58) Field of Search ................................... 342/368, 371, 342/372

(56) References Cited

U.S. PATENT DOCUMENTS 5,680,141   10/1997   DiDomenico et al. .

*Primary Examiner*—Thomas H. Tarcza
*Assistant Examiner*—Fred H. Mull
(74) *Attorney, Agent, or Firm*—Paul S. Clohan, Jr.

(57) ABSTRACT

A radar system has a transceiver and a ferroelectric phased array antenna. The antenna includes a plurality of radiating elements each connected to a ferroelectric phase shifter. The transceiver and the phase shifters are coupled for conveyance of radio frequency signals therebetween. A beam control computer calculates phase shifter control voltages which are applied to a beam correction computer. A temperature sensor is coupled to each phase shifter to provide feedback temperature values to the beam correction computer. A data table in the beam correction computer provides phase shifter correction voltages as a function of control voltage amplitudes and temperature values. The beam correction computer uses the data table in determining temperature corrected phase shifter control voltages which are applied to the associated phase shifters.

8 Claims, 5 Drawing Sheets

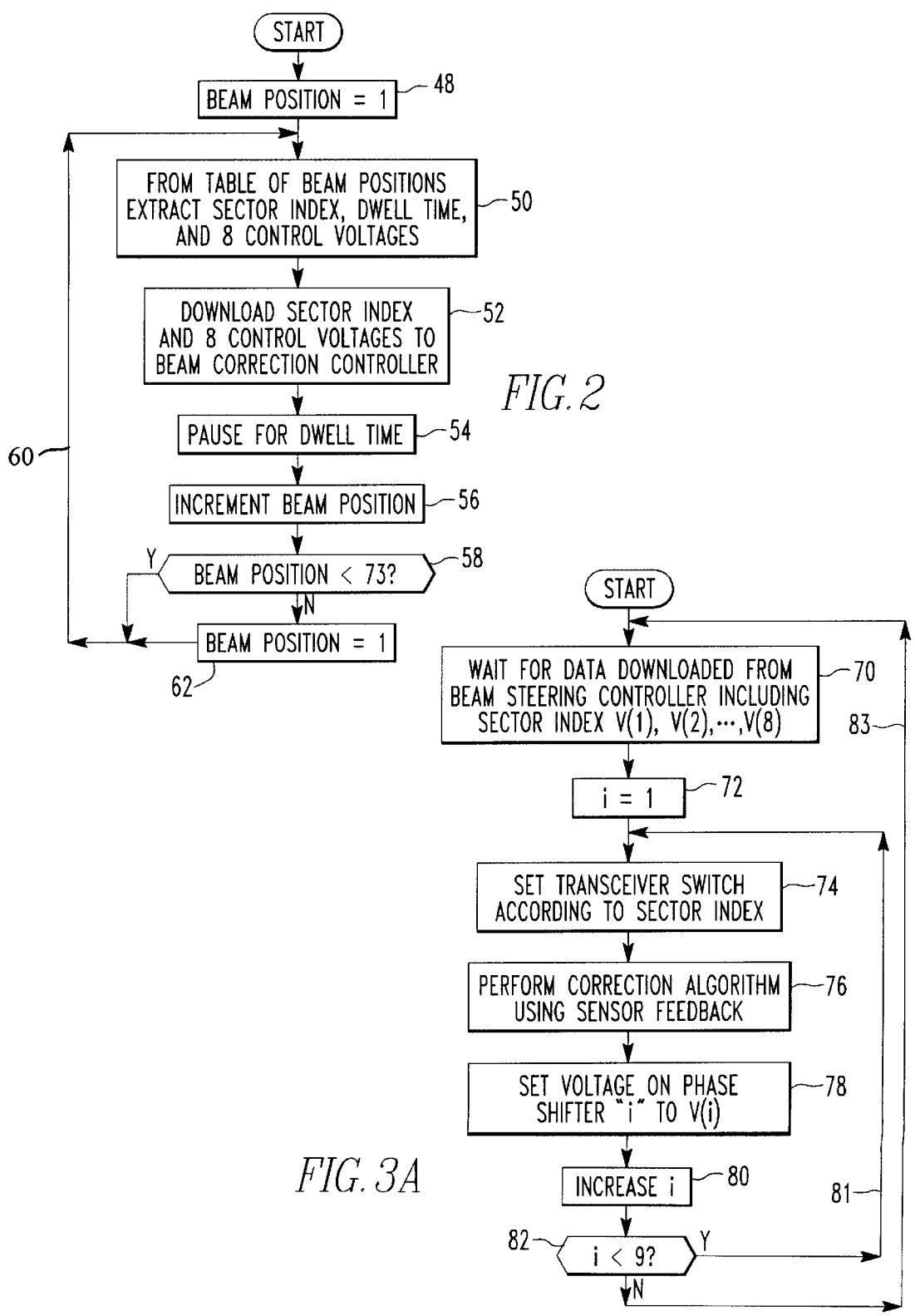

| TEMPERATURE (°C) | | | | | | | |
|---|---|---|---|---|---|---|---|
| VOLTAGE (mVOLTS) | 0 | 5 | 10 | 15 | 20 | 25 | 30 |
| 0 | a1 | a2 | a3 | a4 | a5 | a6 | a7 |
| 50 | b1 | b2 | b3 | b4 | b5 | b6 | b7 |
| 100 | c1 | c2 | c3 | c4 | c5 | c6 | c7 |
| 150 | d1 | d2 | d3 | d4 | d5 | d6 | d7 |
| 200 | e1 | e2 | e3 | e4 | e5 | e6 | e7 |
| 250 | f1 | f2 | f3 | f4 | f5 | f6 | f7 |
| | | | | | | | |
| | | | | | | | |
| | | | | | | | |

61

| BEAM POSITION | SECTOR INDEX | DWELL TIME | v(1) | v(2) | v(3) | v(4) | v(5) | v(6) | v(7) | v(8) |
|---|---|---|---|---|---|---|---|---|---|---|
| 1 | 1 | d1 | 1e1 | 2e1 | 3e1 | 4e1 | 5e1 | 6e1 | 7e1 | 8e1 |
| 2 | 1 | d2 | 1e2 | 2e2 | 3e2 | 4e2 | 5e2 | 6e2 | 7e2 | 8e2 |
| ... | | | | | | | | | | |
| 24 | 1 | d24 | 1e24 | 2e24 | 3e24 | 4e24 | 5e24 | 6e24 | 7e24 | 8e24 |
| 25 | 2 | d25 | 1e25 | 2e25 | 3e25 | 4e25 | 5e25 | 6e25 | 7e25 | 8e25 |
| ... | | | | | | | | | | |
| 36 | 2 | d36 | 1e36 | 2e36 | 3e36 | 4e36 | 5e36 | 6e36 | 7e36 | 8e36 |
| 37 | 3 | d37 | 1e37 | 2e37 | 3e37 | 4e37 | 5e37 | 6e37 | 7e37 | 8e37 |
| ... | | | | | | | | | | |
| 72 | 3 | d72 | 1e72 | 2e72 | 3e72 | 4e72 | 5e72 | 6e72 | 7e72 | 8e72 |

RADAR SYSTEM HAVING A FERROELECTRIC PHASED ARRAY ANTENNA OPERATING WITH ACCURATE, AUTOMATIC ENVIRONMENT-CALIBRATED, ELECTRONIC BEAM STEERING

GOVERNMENT INTEREST

The invention described herein may be manufactured, used, licensed by or for the Government of the United States for governmental purposes without the payment to us of any royalties therefor.

BACKGROUND OF THE INVENTION

The present invention relates to radar systems and more particularly to radar systems employing electronically steered, radar antenna arrays.

A dish antenna directs a radar beam in a single fixed direction, and the antenna is mechanically repositioned to change the beam direction. The dish antenna is rotated to produce a 360 degree scanning beam.

An electronic radar antenna produces directional beam control through phase control of the individual antenna radiating elements, without requiring mechanically driven movement of the antenna. Generally, the individual radiating elements are operated in combination so that the collective radiation from the elements forms a beam which scans over a field of observation in accordance with electronic steering control. Normally, each radiating element has a phase delay circuit element connected to it to determine when it radiates and thereby provide the basis upon which the beam is formed and scanned.

Electronic beam-steering antenna arrays can be used in various kinds of radar systems. Thus, these arrays can be used in target acquisition systems, communication systems, pulsed radar systems, continuous wave radar systems, etc.

Conventional phase shift elements include ferrite (iron based) devices, PIN diode or other semiconductor devices, and ferroelectric (ceramic) devices. The ferrite phase shift devices can handle higher power signals, but they impose relatively high antenna array manufacturing costs, they operate unidirectionally with nonreciprocity in the propogation of transmit and receive signals and they are highly susceptible to temperature changes making temperature calibration difficult to achieve.

In general, semiconductor phase shifters are compact but they are normally limited to small signal applications. PIN diodes operate with discrete phase steps which disadvantageously results in a jumping beam as opposed to a smoothly scanning beam.

Ferroelectric phase shifters operate with continuous variability, operate under voltage control with low power consumption, and operate reciprocally for transmitting and receiving signals. Accordingly, ferroelectric phase shifters are highly desirable for use in electronic beam-steering arrays.

Similarly to the case of ferrite phase shifters, ferroelectric phase shifters operate with a strong dependence on environmental factors, including mainly temperature and humidity. As a consequence of this dependence, the control of beam direction through ferroelectric phase shifters is adversely affected by environmental variations including variations in the temperature of each ferroelectric phase shifter element connected to an antenna array.

Automatic temperature calibration has been implemented in beam steering control to compensate for temperature-based errors in radar systems employing ferroelectric phase shifters, as disclosed in U.S. Pat. No. 5,680,141, entitled TEMPERATURE CALIBRATION SYSTEM FOR A FERROELECTIC PHASE SHIFTING ARRAY ANTENNA, filed by the current inventors on May 31, 1995, and assigned to the current assignee. In that prior disclosure, a controller employs a calibration function which represents the relationship between temperature and calibration error factors that are multiplied against basic phase shift control data to produce calibrated phase shift control data for temperature compensated beam steering. The prior calibration function uses an equation which is stored as a tenth order polynomial representing error factor versus temperature for the controlled antenna array.

The referenced prior system thus basically provides temperature-calibrated antenna operation in a radar system employing a ferroelectric phased array antenna. However, the prior system requires excessive computation capacity and makes phase voltage corrections with limited accuracy.

Thus, multiplication procedures emloyed in the referenced prior system is computation intensive thereby limiting the utility of the prior system. More particularly, a polynomial equation converts feedback temperature deviation from a nominal setpoint to a correction factor which is multiplied against the uncorrected, steering drive voltage at the nominal temperature. The product is a corrected phase voltage which is an estimate of the voltage actually needed to produce a correct phase shift for a particular phase shift element.

Further, the drive voltages for all elements are corrected by multiplication against the same correction factor, thereby limiting system accuracy. This accuracy limitation results from the fact that temperature-based phase correction is dependent on drive voltage amplitude, whereas the prior system operates with a presumption that temperature-based phase correction is independent of drive voltage amplitude.

A need thus exists to imrove upon the current state of the pertaining art by providing better compensation for environmental parameters in the beam steering of a radar system having a ferroelectric phased array antenna.

SUMMARY OF THE INVENTION

A radar system comprises a transceiver coupled to a phased array antenna having a plurality of spaced radiating elements and respective ferroelectric phase shifters connected to the radiating elements. A sensor arrangement is coupled to the phase shifters to detect an environmental parameter associated therewith.

A beam steering controller computes respective control voltages for the phase shifters to produce and electronicallly scan a shaped beam. A beam correction controller receives the phase shifter control voltages and representations of feedback signals from the sensor arrangement, and has stored data which defines phase shifter correction voltage as a function of phase shifter control voltage amplitudes and values of the environment parameter.

The beam correction controller processes each phase shifter control voltage and an associated parameter value corresponding to the feedback signal representation, and determines a phase shifter correction voltage for the processed phase shifter control voltage from the stored data. Further, the beam correction controller sums each phase shifter control voltage with the associated correction voltage determined from the stored data to generate a corrected phase shifter control voltage for application to the associated phase shifter through a drive circuit.

BRIEF DESCRIPTION OF THE DRAWINGS

The accompanying drawings, which are incorporated in and constitute a part of this specification, illustrate a preferred embodiment of the invention, and, together with the description in this specification, provide an explanation of the objects, advantages, and principles of the invention. In the drawings:

FIG. 2 illustrates beam steering controller logic used in the system of FIG. 1;

FIGS. 3A and 3B shows beam correction controller logic used in the system of FIG. 1;

FIG. 4 is a graph showing change in phase shifter phase (in milivolts) as a function of feedback phase shifter temperature and providing data for the beam steering correction control logic of FIG. 3; and FIGS. 5 and 6 show data table structures respectively employed in the beam steering control logic and the beam correction control logic of FIGS. 2 and 3.

DESCRIPTION OF THE PREFERRED EMBODIMENT

Generally, a radar system of the invention employs a transceiver and a phased array antenna having individually enrgized antenna elements, with a ferroelectric phase shifter connected between the transceiver and each antenna element. In the preferred embodiment, temperature sensors provide feedback temperature data for each phase shifter. A control system executes a real time algorithm preferably employing data tables to convert temperature deviations from a reference temperature value into a phase shift voltage correction with dependence on uncorrected drive voltage amplitudes. The phase shift voltage corrections are used, preferably in summing procedures, to adjust phase shifter control voltages computed by a beam steering controller. The adjusted control voltages are applied to the phase shifters to provide better radar system operation with improved beam pointing accuracy for the electronically steered, ferroelectric phased array antenna. A radar system of the invention is substantially less computation intensive than prior radar systems, yet the invention provides better system performance.

Figure 1:
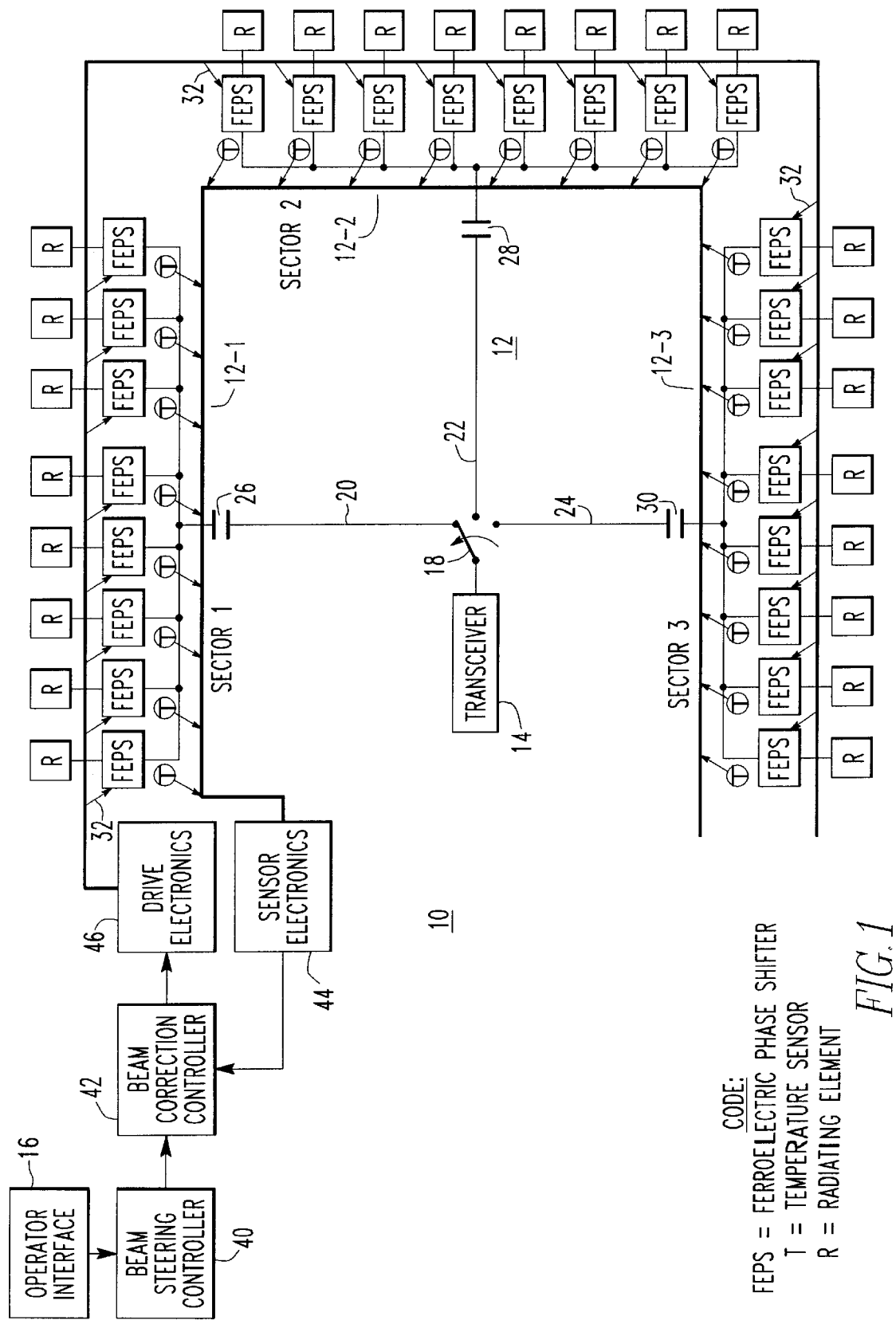
FIG. 1 is a block diagram of a radar system having a ferroelectric phased array antenna and configured in accordance with the invention to provide controlled antenna beam steering with correction for one or more environmental variables including temperature and humidity.

The invention is preferably embodied as shown in FIGS. 1–6. As shown in FIG. 1, a radar system 10 employs a ferroelectric phased array antenna 12 to transmit and receive radio frequency signals for target detection or other purposes. A transceiver 14 employs a 25 Ghz or other frequency source (not specifically shown) in the transmission of radio frequency signals and in the reception of return signals. In this case, the transmitted signals are pulses.

The antenna array 12 includes three panels or sectors 12-1, 12-2, and 12-3 which are physically configured in a solid equilateral triangular structure (not indicated in FIG. 1). In use, the triangulated antenna array 12 is supported on a horizontal platform so that radiating elements R in the three sectors face outwardly to radiate horizontally.

Typically, the radiating elements R generate a beam which extends, at any particular azimuth, outwardly with an elevation up to about 60 degrees. The beam is electronically controlled to rotate horizontally through 360 degrees at a scanning rate which can be set by an operator through an operator interface 16.

Ferroelectric phase shifters FEPS are respectively connected in series with the radiating elements R to provide a basis for beam pattern and steering control. The transceiver 14 is connected to the ferroelectric phase shifters FEPS through paths 20, 22, and 24 subject to transceiver controlled operation of a sector switch 18. Respective capacitors 26, 28, and 30 isolate DC voltages from application to the ferroelectric phase shifters FEPS.

In the transmit mode, the transceiver 14 transmits pulses through a conventional internal transmit/receive (T/R) switch in its transmit state (not shown) through the sector switch 18 to the ferroelectric phase shifters FEPS and radiating elements R in the sector 12-1 or 12-2 or 12-3. In the receiving mode, radio frequency signals received by the radiating elements R are coupled to the transceiver 14 through the ferroelectric phase shifters FEPS, the paths 20, 22, and 24, and the sector switch 18 when the T/R switch is in the receive state.

A control voltage (in millivolts) applied across each ferroelectric phase shifter FEPS, as indicated by reference character 32, delays transmission of any transmitted or received radio frequency signal therethrough according to the magnitude of the control voltage. A pattern of control voltages is applied to the ferroelectric phase shifters FEPS over time to form and scan transmitted or received beams through timing and FEPS voltage magnitude control over radio frequency signal conduction to or from varying combinations of the radiating elements R.

Figure 3B:
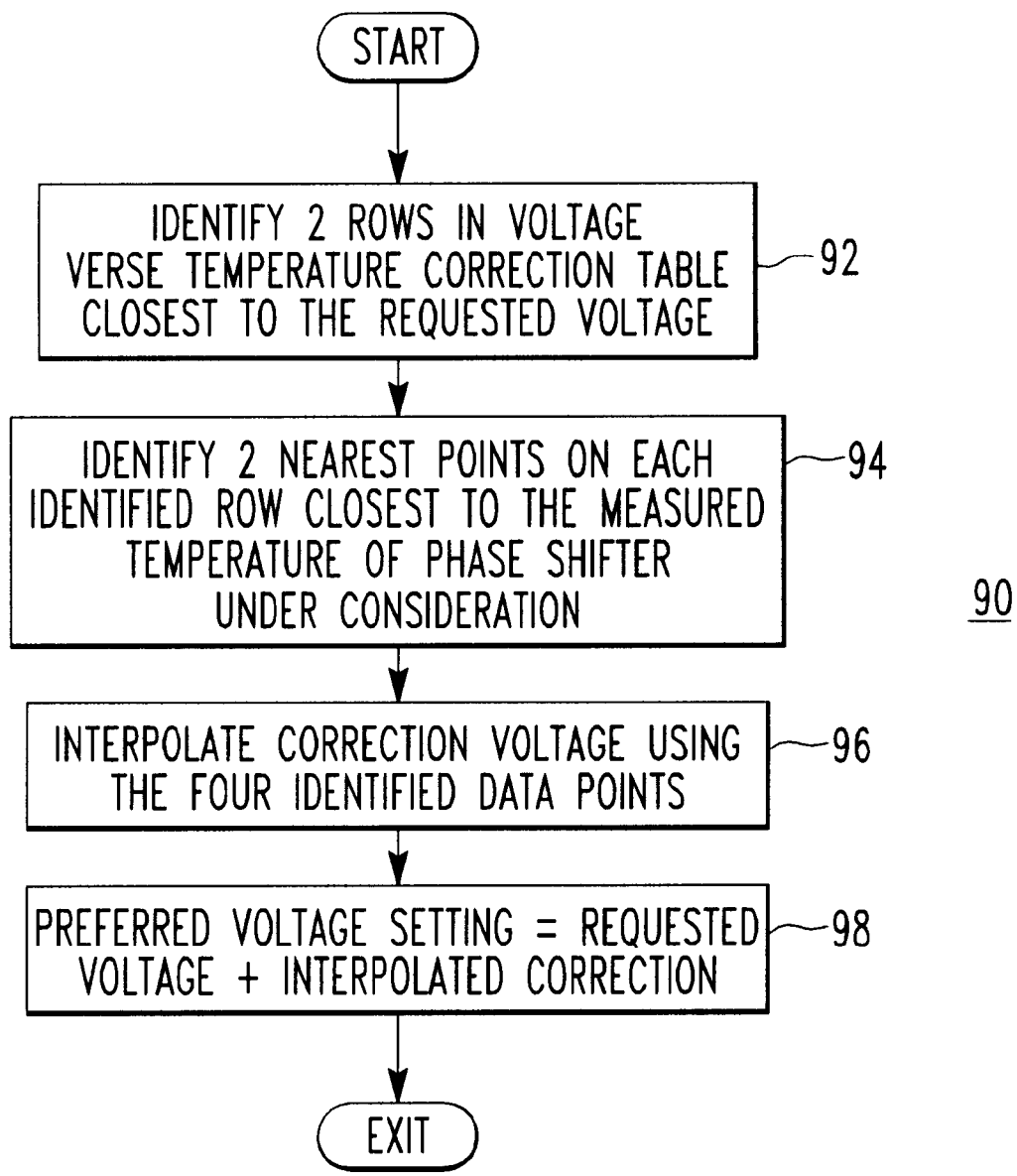
Figures 4, 6:
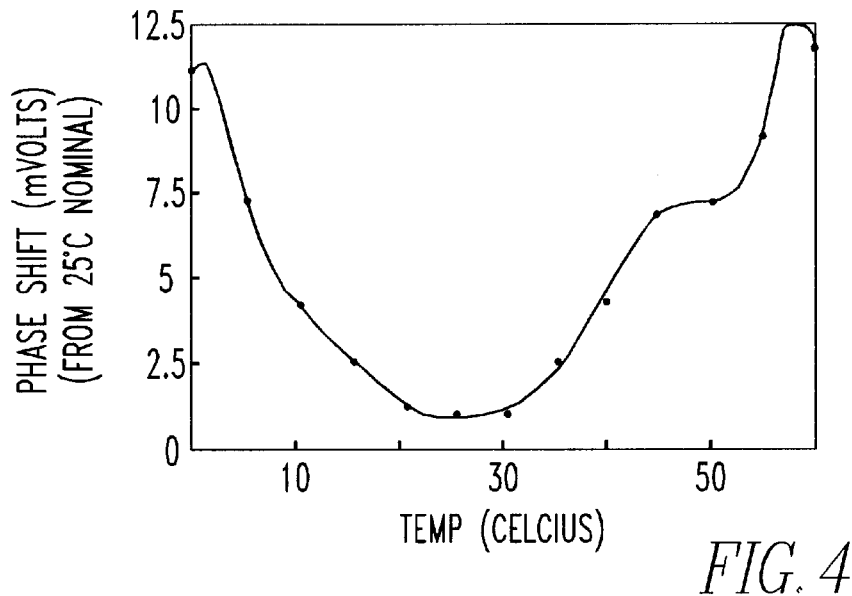

A beam steering controller 40 can be embodied as a programmed microprocessor in which control logic shown in FIG. 2 is used to generate output control signals representing the voltage magnitudes to be applied to the ferroelectric phase shifters FEPS for preselected beam shaping and steering. The beam steering controller 40 applies its output control signal to a beam correction controller 42 where adjustments are made in the control voltages to correct for one or more environmental parameters. The beam correction controller 42 can also be embodied as a programmed microprocessor in which control logic shown in FIG. 3 is used to provide temperature calibration of the beam steering control signals.

In this case, the system applies corrections for the respective temperatures of the individual ferroelectric phase shifters FEPS. In other applications, the invention can also provide corrective adjustments in beam control for humidity, atmospheric pressure, magnetism, etc. in a manner similar to that described herein for temperature corrections.

Individual temperature sensors T are coupled with the respective ferroelectric phase shifters FEPS. Sensor electronics 44 receives individual feedback analog signals through conductors from the sensors T, and processes and interfaces them for application to the beam correction controller 42.

The beam correction controller 42 generates ouputs representing temperature corrected control voltages, and applies these outputs to drive electronics 46 which converts the outputs to individual analog voltage control signals. Conductors route and apply (32) the analog voltage control signals to the individual ferroelectric phase shifters FEPS.

Generally, the beam steering controller 40 functions to scan the antenna beam through a series of positions, preferably constituting a scan of 360 degrees. A data table 53 shown in FIG. 5 provides stored data which defines the array sector to be illuminated, a dwell time for the beam to point in each beam position, and a nominal voltage setting for each ferroelectric phase shifter FEPS in each beam position.

If the nominal table voltage settings were to be applied to the FEPS, the beam pattern and azimuth would be accurate from beam position to beam position, only if each FEPS were operating at a predefined nominal temperature, i.e., 25 degrees Centigrade in this case.

Usually, the FEPS operating temperatures would differ from the nominal temperature. The invention therefore applies corrections to the nominal FEPS control voltage settings, and does so with better accuracy and reduced computational load as compared to the prior art.

As shown in the logic diagram of FIG. 2, the beam steering controller 40 operates cyclically in making computations for successive beam positions. After startup, beam position "1" is set in logic block 48, and logic block 50 references the table 53 (FIG. 5) to determine the sector index (i.e., sector 1 or 2 or 3), beam dwell time, and control voltages for all of the eight FEPS in the indexed sector.

The structure of the table 53 includes seventy-two successive rows representing seventy-two successive beam positions. Each row is provided with sector, dwell, and FEPS control voltage data in successive columns, as shown. FIG. 5 omits some rows of the table as indicated by break lines to conserve drawing space.

After execution of block 48, logic block 52 downloads the sector index and control voltage data to the beam correction controller 42. After block 54 executes a pause for the current beam dwell time, block 56 increments the beam position to "2", and a test block 58 makes a return through path 60 for a repeat execution of the control logic blocks 50–56 for the next beam position.

In this case, the beam steering controller 40 processes a total of 72 beam positions in each beam scan. When beam position "72" has been processed, the test block 58 causes a recycle block 62 to reset the beam position to 1 and make a return through the path 60 to process the next beam scan.

The beam steering controller 40 applies the beam data for each beam position to the beam correction controller 42 for temperature calibration, i.e., for corrective changes in the FEPS control voltages according to the actual, individual, feedback FEPS temperatures from the sensors T. The beam correction controller 42 computes corrected FEPS control voltages from correction voltage values determined from a data table 61 (FIG. 6) which is structured to provide voltage correction values for different FEPS control voltages at different FEPS operating temperatures.

The table 61 is loaded with representative FEPS control voltage correction values a1–a7 through f1–f7 to illustrate its construction. The tabular FEPS control voltage correction values are established by reference to empirical data such as that represented by a FEPS temperature calibration shown in FIG. 3.

The data table 61 for the beam correction controller 42 generally represents voltage correction values needed for temperature calibration at FEPS operating voltages listed for the successive table rows and at FEPS operating temperatures listed for the successive table columns. Each table cell provides a FEPS correction voltage value for the FEPS voltage and temperature conditions represented by the intersecting row and column for that cell. Each selected FEPS correction voltage is summed with the associated FEPS control voltage received from the beam steering controller to generate corrected phase shifter control voltages with improved accuracy and reduced computational loading.

FIG. 3 is a logic diagram showing the control logic preferably employed in implemeting beam correction in accordance with the invention. After startup, block 70 enters a wait state for downloaded data from the beam steering controller 40. After download, block 72 sets a counter equal to 1 corresponding to FEPS #1 in the sector #1.

Next, logic block 74 sets the transceiver sector switch 18 according to the current sector index. A correction algorithm is then perfomed by logic block 76 to determine a corrected control voltage for the FEPS #1 with use of the correction voltage data from the table 61 and with the use of feedback data from the temperature sensor T for the FEPS #1. In logic block 78, the corrected control voltage is set for application to the FEPS #1.

Block 80 increments the i counter to 2 and a return is made through test block 80 and path 81 to reexecute the blocks 74–78 for the FEPS #2. Recycling continues until the test block 82 detects an i count of 8, indicating that all FEPS in the sector #1 have been processed. A return is then made through path 83 to the block 70 to process the FEPS in the sector #2 for correction of the associated downloaded control voltages. After completion of processing for the FEPS in the Sector #2, a return is made to process the FEPS in the sector #3. Thereafter, the processing is completed for the first beam scan, and a return is made to the block 70 to recycle the process for the next beam scan.

As already indicated, the data table 61 for beam correction control represents voltage correction values at different FEPS voltages and temperatures. During execution for a particular FEPS, the correction algorithm locates the four nearest points in the table 61.

First, two rows of data are identified in correspondence to the nearest FEPS voltages above and below the control voltage requested by the beam steering controller 40. Next, two points are selected along each of these two rows corresponding to the nearest temperatures above and below the feedback temperature measured for the FEPS being considered.

The four data points are then interpolated, preferably linearly, to compute from the four corresponding table correction control voltages an interpolated correction voltage for temperature correction of the requested FEPS control voltage. The correction voltage is added to the requested control voltage and the sum is output for application to the corresponding FEPS in the antenna array 12.

The control logic can be embodied with the use of fuzzy logic principles in alternative embodiments of the invention. Generally, fuzzy logic divides one or more continuous analog variables into a set of finite categories or operating points. Normally, fuzzy logic is useful when a limited data set is available for interpreting input variables into output data. When the one or more continuous variables are at a value between the nominal center of categories, a process of "defuzzification" is used to interpolate a more representative value.

The foregoing description of the preferred embodiment(s) illustrates the invention without intent to be exhaustive or to limit the invention to the form(s) disclosed. In embodying the invention, those skilled in the pertaining art can make modifications and variations without departing from its scope and spirit. The claims appended hereto, and their equivalents, define the scope of the invention.

What is claimed is:

1. A radar system comprising:
   a transceiver for generating radio frequency signals and for processing received radio frequency signals;
   a phased array antenna having a plurality of spaced radiating elements and respective ferroelectric phase shifters connected to the radiating elements;

the transceiver coupled to the ferroelectric phase shifters to apply the generated radio frequency signals to the radiating elements for transmission and to receive for processing radio frequency signals received by the radiating elements;

a sensor arrangement coupled to the phase shifters for detecting an environmental parameter associated therewith;

a beam steering controller for computing respective control voltages for the phase shifters to produce and electronically scan a shaped beam;

a beam correction controller receiving the phase shifter control voltages and representations of feedback signals from the sensor arrangement;

the beam correction controller having stored data which defines phase shifter correction voltage as a function of phase shifter control voltage amplitudes and values of the environmental parameter;

the beam correction controller processing each phase shifter control voltage and an associated parameter value corresponding to the associated feedback signal representation and determining a phase shifter correction voltage for the processed phase shifter control voltage from the stored data;

the beam correction controller summing each phase shifter control voltage with the associated correction voltage determined from the stored data to generate a corrected phase shifter control voltage for application to the associated phase shifter; and a drive circuit for coupling corrected phase shifter control voltages to the associated phase shifters to control phase shifting of radio frequency signals being received by and transmitted from the phased-array antenna.

2. The system of claim 1 wherein the sensor arrangement includes a plurality of temperature sensors respectively associated with phase shifters in the phased array antenna, and the stored data in the beam correction controller defines correction voltages as a function of control voltage amplitudes and phased shifter temperatures.

3. The system of claim 2 wherein the phased array antenna has a triangular shaped form with equal numbers of radiating elements disposed on and facing outwardly from each of three sides of the triangular shaped form.

4. The system of claim 2 wherein the stored data is configured in a stored data table with temperature values heading one of columns and rows in the table and phase shifter control voltage magnitudes heading the other of columns and rows in the table.

5. The system of claim 2 wherein the beam correction controller employs an interpolation procedure for determining correction voltages for temperatures and/or control voltage amplitudes which fall between stored data values.

6. A radar system comprising:

means for generating radio frequency signals and for processing received radio frequency signals;

a phased array antenna having a plurality of spaced radiating elements and respective ferroelectric phase shifters connected to the radiating elements;

means for coupling the radio frequency signals between the generating means and the phase shifters;

means for sensing a temperature value for each phase shifter;

means for computing respective control voltages for the phase shifters to produce and electronically scan a shaped beam;

means for correcting the phase shifter control voltages in accordance with temperature value representations of feedback signals from the temperature sensing means;

the correcting means having stored data which defines phase shifter correction voltage as a function of phase shifter control voltage amplitudes and temperature values;

the correcting means processing each phase shifter control voltage and an associated temperature value representation and determining a phase shifter correction voltage for the processed phase shifter control voltage from the stored data;

the correcting means further summing each phase shifter control voltage with the associated correction voltage determined from the stored data to generate a corrected phase shifter control voltage for application to the associated phase shifter; and means for coupling the corrected phase shifter control voltages to the associated phase shifters to control phase shifting of radio frequency signals being received by and transmitted from the phased array antenna.

7. A method for operating a radar system, the steps of the method comprising:

generating radio frequency signals for transmission;

employing a plurality of spaced radiating elements and respective ferroelectric phase shifters to transmit and receive radio frequency signals;

coupling the generated radio frequency signals to the phase shifters;

sensing a temperature value for each phase shifter;

computing respective control voltages for the phase shifters to produce and electronically scan a shaped beam;

storing data which defines phase shifter correction voltage as a functiion of phase shifter control voltage amplitudes and temperature values;

processing each phase shifter control voltage and an associated temperature value and determining a phase shifter correction voltage for the processed phase shifter control voltage from the stored data;

summing each phase shifter control voltage with the associated correction voltage determined from the stored data to generate a corrected phase shifter control voltage for application to the associated phase shifter; and coupling the corrected phase shifter control voltages to the associated phase shifters to control phase shifting of radio frequency signals being received by and transmitted from the phased array antenna.

8. The method of claim 7 wherein:

the storing step includes the substep of storing discrete values of temperature in one of columns and rows of a table and storing discrete values of voltage amplitude in the other of rows and columns; and the processing step includes the substep of interpolating between temperature values and/or control voltage amplitude values when the phase shifter control voltage falls between two stored discrete temperature values and/or two stored discrete control voltage amplitude values.

* * * * *